March 8, 1949.  H. P. ALLEN  2,463,934
CONTROL MECHANISM FOR CLOTHES DRYING APPARATUS
Filed April 10, 1946

WITNESSES:

INVENTOR
HAROLD P. ALLEN.
BY
ATTORNE*

Patented Mar. 8, 1949

2,463,934

UNITED STATES PATENT OFFICE 2,463,934

CONTROL MECHANISM FOR CLOTHES-DRYING APPARATUS

Harold P. Allen, Mansfield, Ohio, assignor to Westinghouse Electric Corporation, East Pittsburgh, Pa., a corporation of Pennsylvania Application April 10, 1946, Serial No. 660,980

2 Claims. (Cl. 34—45)

My invention relates to apparatus for drying fabrics or the like and has for an object to provide improved apparatus of this character.

A further object of the invention is to provide improved control means for a drier of the so-called domestic type, wherein the steps of drying the fabrics, subsequently cooling the fabrics for comfortable handling, and terminating operation of the drier are automatically effected without the attention of the operator, provision being made for the manual stopping of the drier at the will of the operator.

These and other objects are effected by my invention as will be apparent from the following description and claims taken in connection with the accompanying drawings forming a part of this application, in which:

Figures 1, 2:
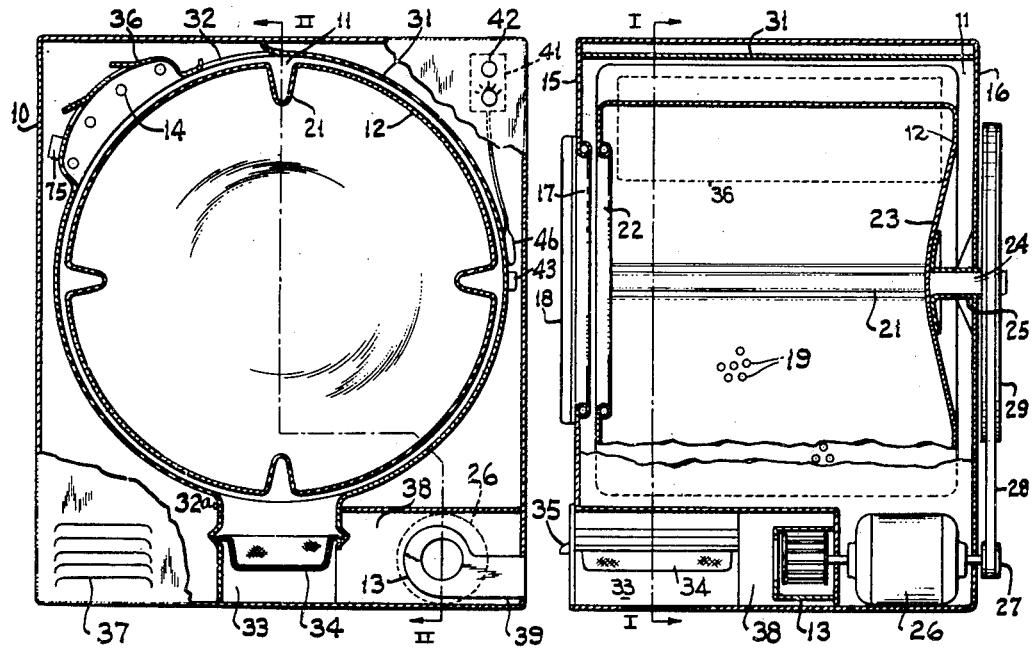
Fig. 1 is a vertical sectional view of a drier for clothes controlled in accordance with my invention and taken along the line I—I of Fig. 2.
Fig. 2 is a section taken along the line II—II of Fig. 1.

Referring now to the drawing, I have disclosed a clothes drier of the so-called domestic type including, generally, a casing 10 having a drying chamber 11 formed therein, a motor-driven basket 12 rotatable within the drying chamber 11 about a substantially horizontal axis for tumbling the fabrics, a fan or blower 13 for translating air through the chamber 11, and a heater 14 for heating the air circulated through the chamber 11. The casing 10 includes a front wall 15 and a rear wall 16, the former being provided with an access opening 17, which is closed by a suitable hinged door 18.

The basket 12 is generally cylindrical in configuration and perforated for the passage of air through the basket, a number of the perforations being shown at 19. A plurality of vanes or baffles 21 extend inwardly radially of the basket for tumbling the fabrics during the rotation of the basket. The front side of the basket 12 is provided with an access opening 22 which registers with the access opening 17 in the casing. The rear wall 23 of the basket is fixed to a shaft 24 which is journalled in a bearing 25 suitably secured to the rear wall 16 of the casing 10. The basket 12 is rotated at a relatively low speed of, for example, 50 R. P. M., by an electric motor 26 disposed in the lower portion of the casing and driving a pulley 27 which is belted, as shown at 28, to a sheave 29 carried by and rotatable with the shaft 24.

The heating or drying chamber 11 is encompassed by a generally cylindrical baffle 31 which, as shown in Fig. 2, extends from the front wall 15 to the rear wall 16. The baffle 31 is provided with an air inlet opening 32 adjacent the top thereof, and the bottom of the baffle 31 connects with a downwardly-extending throat 32a, the latter enclosing a passage 33 in which a lint trap 34 is disposed. The latter may be of any well-understood construction and preferably is formed of wire cloth for accumulating lint carried in the air stream discharged from the chamber 11. As shown in Fig. 2, the lint trap 34 is provided with a handle 35 and is removable through a suitable opening formed in the front wall of the casing.

The cylindrical baffle 31 is also formed to provide a cove 36 which encloses the electric heater 14. The heater 14 may be of any well-understood construction, and preferably is formed of a length of bare heating wire in order to impart heat radiantly to the basket structure 12 and the fabrics contained therein. In this connection, it will be understood that substantially the entire side wall of the basket 12 is perforate.

Air from the ambient atmosphere is admitted to the casing through a louvered opening 37. The air passes upwardly within the casing and enters the inlet opening 32, and thence through the basket 12 wherein it is heated radiantly by the heater along with the fabrics. Moisture in the fabrics is evaporated and carried in the air stream through the passage 33 to a compartment 38 which communicates with the eye of the blower 13. The blower 13 discharges the damp air to the ambient atmosphere through a discharge nozzle 39 extending through a side wall of the casing.

In accordance with my invention, the heater 14 and the motor 26 are controlled by a thermostatic device generally indicated at 41 and carried in a convenient location by the front wall 15 of the cabinet. The control 41 is provided with a manually-operated handle 42, which, when withdrawn, effects energization of both the heater and the motor, as described hereinafter. Energization of both the heater and the motor may be terminated at the will of the operator by manually moving the handle 42 inwardly.

During automatic operation, energization of the heater is terminated in response to a predetermined high temperature within the drying chamber of, for example, 175 degrees to 200 degrees Fahrenheit, depending upon the adjustment of the thermostat. During the period when the temperature of the air in the drier is increasing a second thermostatic device, shown at 43, closes to complete a shunt or holding circuit for the motor 26, so that after the primary thermostat 41 opens to terminate operation of the heater, the motor will continue to operate for the circulation of air through the drier. During this continued operation, the cool air drawn into the drier is heated by the heat stored in the drier structure to complete the drying operation, and a concomitant of this operation is that the clothes are cooled to a low temperature of, for example, 140 degrees Fahrenheit, at which temperature they may be comfortably handled. When the temperature of the fabrics in the drier has been depressed to 140 degrees Fahrenheit, the themostatic device 43 opens the circuit of the motor 26, whereupon the circulation of air through the drier and the tumbling of the fabrics therein are terminated. The control mechanism for effecting this operation is diagrammatically shown in Fig. 3, which will now be described.

Figure 3:
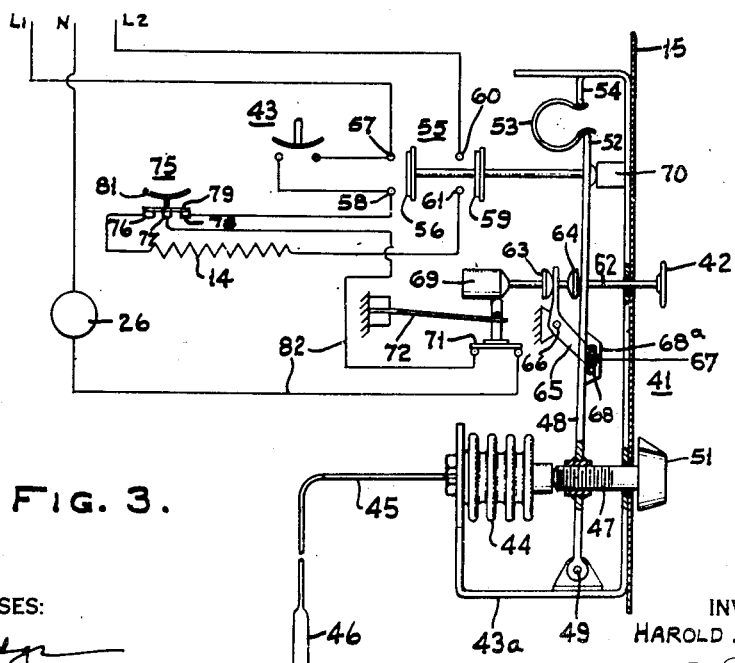
Fig. 3 is a diagrammatic view of the control apparatus for the drier shown in Figs. 1 and 2.

As shown in Fig. 3, the thermostatic device 41 includes a frame structure 43a which may be secured to the front wall 15 of the casing for support. The thermostat 41 is of a hydraulic type and includes an expansible bellows 44 connected by means of a capillary tube 45 to a heat-responsive bulb 46 secured to a portion of the baffle 31, whose temperature closely follows the temperature of the clothes being dried. In one form of drier constructed in accordance with my invention, the heat-responsive bulb 46, when fixed to the baffle 31 approximately in the location shown in Fig. 1, closely followed in temperature the temperature of the fabrics being treated. In this connection, the thermostat 43 may be adjacent the bulb 46, as shown, so that its temperature closely follows the temperature of the fabrics, or the thermostat 43 may be disposed in other regions of the drying chamber where it is subjected to a higher range of temperatures, which range, however, follows proportionately or bears a predetermined relation to the range of temperatures of the fabrics. The latter arrangement of the thermostat 43 may be desirable if a high differential type of thermostat is used.

One end of the bellows 44 may be fixed to the frame 43a in any suitable manner, and the movable end of the bellows 44 engages an adjustable screw 47 threaded in an arm 48 which is pivoted, as shown at 49, to the frame 43a. The outer or accessible end of the screw 47 is provided with a handle 51 for adjusting the temperature at which the heater 14 is deenergized. As shown, the arm 48 is provided at its upper end with a knife edge 52 which bears against one leg of a horseshoe spring 53, the opposite leg of which bears against an adjustable knife edge 54. The upper end of the arm 48 also carries a double-pole switch, generally indicated at 55, one pole of which includes a movable contact 56 and stationary contacts 57 and 58, and the other pole of which includes a movable contact 59 adapted to bridge stationary contacts 60 and 61.

As set forth heretofore, the double-pole switch 55 is manually closed by withdrawing the handle or button 42. In order to accomplish this operation, the button 42 is connected to a rod 62, which is provided with spaced shoulders 63 and 64 for actuating a bellcrank lever 65, the latter being movable about a fixed pivot shown at 66. The bellcrank is provided with a laterally-projecting pin 67 which extends within a slot 68 formed in an upturned ear 68a of the arm 48. During movement of the handle 42 outwardly to the right from the position shown in Fig. 3, the bellcrank 65 is moved clockwise and swings the arm 48 counterclockwise to close the double-pole switch 55. Expansion of the bellows 44 in response to an increased temperature swings the arm 48 clockwise and the bellcrank counterclockwise. Accordingly, the switch 55 is opened and the rod 62 is moved to the position shown in Fig. 3. Snap-acting movement of the arm 48 between its switch-open and switch-closed positions is effected by the horseshoe compression spring 53, as is well understood. Switch-opening movement of the arm 48 is limited by a stop 70.

The inner end of the rod 62 is provided with a cam 69 which operates a switch 71 controlling operation of the motor 26 and referred to hereinafter. The switch 71 is biased to its open position by a spring 72 and is closed when engaged by the cam 69. The control is shown in Fig. 3 in the position it assumes subsequent to the opening of the switch 55 by the expansion of the bellows. It will be noted that the cam 69 still engages the switch 71 for retaining the latter closed. Opening of the switch 71 is effected by a further manual movement of the button 42 and rod 62 to the left as viewed in Fig. 3, the lost motion provided by the spaced shoulders 63 and 64 permitting this movement of the cam 69. When the button 42 and rod 62 are again moved to the right, the cam 69 first closes the switch 71 and then, after the shoulder 63 engages the bellcrank 65, the bellcrank 65 and arm 48 are moved to close switch 55 as described. Movement of the button 42 to the left from its outermost position wherein the switch 55 is closed, first moves the shoulder 64 into engagement with the bellcrank 65, and then continued movement of the button 42 to the left swings the bellcrank 65 and arm 48 to the switch-open position of the latter and also opens the switch 71.

The source of power for the drier is represented by a three-wire circuit having conductors $L_1$ and $L_2$ and a neutral conductor N defining, for example, a three-wire Edison, single-phase circuit, the potential across the conductors $L_1$ and $L_2$ being 230 volts and the potential between either conductor $L_1$ or $L_2$ and the neutral N being 115 volts. The conductors $L_1$ and $L_2$ are connected, respectively, to the contacts 57 and 60, and the heater 14 is connected across contacts 58 and 61. An over-temperature or safety thermostat 75 is connected, as shown, in series with the heater 14. This thermostat 75 is normally closed, and is opened only when an abnormal over-temperature condition obtains within the drier. Preferably, the thermostat 75 is disposed adjacent the heater 14, as shown in Fig. 1.

Preferably, the thermostat 75 includes three contacts 76, 77 and 78 which are normally bridged by a movable contact 79, the latter being disengaged from the contacts 76, 77 and 78 by a heat-responsive element 81 when an abnormal temperature obtains within the drier. When open, the thermostat 75 isolates the circuits of both the heater 14 and motor 26 from the line conductor $L_1$ and also from each other. As shown, the contact 76 is connected to one terminal of the heater 14 and the contact 77 is connected by a conductor 82 leading to one terminal of the motor 26 through switch 71. The third contact 78 is electrically connected to the contact 58.

The circuit for the motor 26 extends from the neutral conductor N, through the motor 26 to the conductor 82 in which the switch 71 is connected. It will be apparent that the circuit of the motor 26 which extends through the contacts 57 and 58 is energized when the double-pole switch 55 is closed for initiating operation of the heater 14. As set forth heretofore, the thermostat 43 closes during the heating-up period of the drier so that the circuit of the motor 26 is maintained through the thermostat 43 after the heat-responsive bellows 44 operates to open the double-pole switch 55 to deenergize the heater 14. The circuit through the motor 26 is opened subsequently by the thermostat 43 when the temperature of the fabrics within the drier is depressed to a value at which the fabrics may be comfortably handled.

Operation

In the operation of the drier, the damp fabrics as they come from a wringer or a spinning-type washing machine are deposited in the basket 12 and the door 18 is closed. The button 42 is then withdrawn to close the main double-pole switch 55, whereupon the heater 14 is energized to heat the fabrics and the air within the basket, and the motor 26 is energized to circulate air through the basket. During the early stages of the drying operation, the major portion of the energy dissipated by the heater is converted to latent heat of vaporization, so that the rise in temperature is relatively slow. As the drying progresses, less energy is converted to latent heat and more to sensible heat so that the temperature within the drier progressively increases. When the temperature of the fabrics reaches approximately 140 degrees Fahrenheit, the thermostat 43 closes to shunt the contacts 57 and 58, whereby the holding circuit for the motor 26 is established. When the temperature of the fabrics increases to approximately 170 degrees to 200 degrees Fahrenheit, the thermostatic bellows 44 opens the switch 55 for deenergizing the heater 14. As described heretofore, however, the switch 71 remains closed, the switch 71 only being moved to its open position upon manual operation of the button 42 to its innermost position. The fabrics at this time are substantially dry and the continued operation of the motor 26 and the air-circulating fan 13 completes the drying by the utilization of heat stored in the drier structure, and a concomitant of this operation is the cooling of the fabrics. When the temperature of the fabrics is depressed to approximately 140 degrees Fahrenheit, the thermostat 43 opens to terminate operation of the motor 26. The automatic cycle is now complete and the fabrics cooled for comfortable handling are removed from the basket 12.

During operation of the apparatus after the thermostat 43 has closed to maintain operation of the motor 26, the operator may desire to stop operation of the motor for one reason or the other. In this case, the button 42 is pushed to its innermost position for first opening the switch 55 and then opening the switch 71, the latter operation deenergizing the motor 26.

From the foregoing description, it will be apparent that I have provided an improved control mechanism for a drier having a single handle for simultaneously initiating operation of the heater and air-circulating and tumbling means. The control functions to automatically terminate the heating of the fabrics at the conclusion of the drying step in the cycle and, subsequently, the tumbling of the fabrics and the circulation of air thereover. The control may be manually operated at will to terminate operation of the heater or the heater and the air-circulating and tumbling means by the single actuation of said handle. An adjusting knob 51 is provided for varying the temperature at which the heater is deenergized. Once set, this knob need not be further adjusted unless a load requiring additional or less heat is placed in the drier. The operator may, however, adjust the final temperature downwardly by the knob 51, in order to retain some moisture in the fabrics at the conclusion of the cycle, whereby the fabrics may be ironed without dampening or spraying the fabrics.

While I have shown my invention in but one form, it will be obvious to those skilled in the art that it is not so limited but is susceptible of various changes and modifications without departing from the spirit thereof.

What I claim is:

1. In a control mechanism for a clothes drier having motor driven means for tumbling the clothes and means for heating the clothes, the combination of a first switch for controlling said motor driven means, a manually actuated handle for actuating said switch to its open and closed positions, a second switch controlling energization of the heating means, temperature responsive means for actuating said second switch from its closed to its open position in response to a predetermined high temperature within the drier, and a mechanism connecting said handle and said temperature responsive means for actuating said temperature responsive means to its switch closed and switch open positions when the handle is actuated to respectively close and open the first switch, said mechanism including lost motion means for preventing opening of the first switch when the temperature responsive means operates to open the second switch.

2. In a control mechanism for a clothes drier having motor driven means for tumbling the clothes and means for heating the clothes, the combination of a double pole switch for controlling energization of the heating means, a second switch for controlling energization of said motor driven means and connected in series with one pole of said double pole switch, temperature responsive means for actuating said two pole switch from its closed to its open position in response to a predetermined high temperature within the drier, manually operated means for opening and closing both of said switches at will, said manually operated means including a lost motion mechanism for permitting opening of said two pole switch by the temperature responsive means without actuating said second switch to its open position, and means responsive to a second temperature within the drier lower than said predetermined high temperature for shunting said one pole of the two pole switch.

HAROLD P. ALLEN.

REFERENCES CITED

The following references are of record in the file of this patent:

UNITED STATES PATENTS

| Number | Name | Date |
|---|---|---|
| 1,675,160 | Carroll | June 26, 1928 |
| 2,398,880 | Broglie | Apr. 23, 1946 |
| 2,403,630 | Blunk et al. | July 9, 1946 |